United States Patent
Du et al.

(10) Patent No.: US 10,020,119 B2
(45) Date of Patent: Jul. 10, 2018

(54) CAPACITOR STRUCTURE

(71) Applicant: INDUSTRIAL TECHNOLOGY RESEARCH INSTITUTE, Hsinchu (TW)

(72) Inventors: Yi-Chang Du, Taoyuan (TW); Li-Duan Tsai, Hsinchu (TW); Kan-Hsuan Lin, Baoshan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/388,465

(22) Filed: Dec. 22, 2016

(65) Prior Publication Data

US 2017/0186556 A1 Jun. 29, 2017

(30) Foreign Application Priority Data

Dec. 28, 2015 (TW) .............................. 104143993 A
Nov. 17, 2016 (TW) .............................. 105137583 A

(51) Int. Cl.
*H01G 9/15* (2006.01)
*C08K 3/22* (2006.01)
*H01G 9/07* (2006.01)
*H01G 9/025* (2006.01)
*H01G 9/042* (2006.01)
(Continued)

(52) U.S. Cl.
CPC ................. *H01G 9/15* (2013.01); *C08K 3/22* (2013.01); *H01G 9/02* (2013.01); *H01G 9/025* (2013.01); *H01G 9/042* (2013.01); *H01G 9/055* (2013.01); *H01G 9/07* (2013.01); *C08K 2003/2227* (2013.01); *C08K 2003/2296* (2013.01);
(Continued)

(58) Field of Classification Search
CPC ............ H01G 9/15; H01G 9/02; H01G 9/025; H01G 9/042; H01G 9/055; H01G 9/07; C08K 2003/2227; C08K 2003/2296; C08K 2201/001; C08K 2201/003; C08K 2201/011; C08K 3/22
See application file for complete search history.

(56) References Cited

U.S. PATENT DOCUMENTS 4,780,796 A 10/1988 Fukuda et al.
4,910,645 A 3/1990 Jonas et al.
(Continued)

FOREIGN PATENT DOCUMENTS

CN 1321993 A 11/2001
CN 101091229 A 12/2007
(Continued)

OTHER PUBLICATIONS

Machine Translation of TW 201405606.*
(Continued)

*Primary Examiner* — Dion R Ferguson
(74) *Attorney, Agent, or Firm* — Birch, Stewart, Kolasch & Birch, LLP

(57) ABSTRACT

A capacitor structure is provided, which includes a positive electrode, a dielectric layer on the positive electrode, and an organic-inorganic composite layer on the dielectric layer. The capacitor structure also includes a negative electrode, and a conductive conjugated polymer electrolyte disposed between the organic-inorganic composite layer and the negative electrode.

10 Claims, 1 Drawing Sheet

(51) Int. Cl.
  *H01G 9/055* (2006.01)
  *H01G 9/02* (2006.01)
(52) U.S. Cl.
  CPC .. *C08K 2201/001* (2013.01); *C08K 2201/003* (2013.01); *C08K 2201/011* (2013.01)

(56) References Cited

U.S. PATENT DOCUMENTS

| | | | |
|---|---|---|---|
| 6,645,675 B1* | 11/2003 | Munshi | H01B 1/122 252/62.2 |
| 7,621,970 B2 | 11/2009 | Furusawa et al. | |
| 8,114,318 B2 | 2/2012 | Kuang et al. | |
| 8,339,770 B2* | 12/2012 | Yoshida | H01G 9/0036 29/25.03 |
| 8,441,776 B2 | 5/2013 | Komatsu et al. | |
| 8,771,381 B2 | 7/2014 | Chen et al. | |
| 2004/0130856 A1* | 7/2004 | Fujii | H01G 9/042 361/523 |
| 2004/0184222 A1 | 9/2004 | Tsai et al. | |
| 2007/0146969 A1* | 6/2007 | Naito | H01G 9/012 361/523 |
| 2011/0157775 A1* | 6/2011 | Cheng | H01G 9/008 361/524 |
| 2011/0252613 A1 | 10/2011 | Freeman et al. | |
| 2014/0002957 A1* | 1/2014 | Casasanta, III | H01G 11/62 361/502 |
| 2014/0313638 A1* | 10/2014 | Kato | H01G 9/07 361/524 |
| 2016/0028067 A1* | 1/2016 | Pekala | C08J 5/18 428/312.6 |

FOREIGN PATENT DOCUMENTS

| | | |
|---|---|---|
| CN | 103578769 A | 2/2014 |
| CN | 104752061 A | 7/2015 |
| JP | 2004-47886 A | 2/2004 |
| JP | 2005-294505 A | 10/2005 |
| JP | 4442287 A | 3/2010 |
| JP | 2010-267778 A | 11/2010 |
| TW | 201405605 A | 2/2014 |
| TW | 201435938 A | 9/2014 |
| TW | I483275 B | 5/2015 |
| TW | 201526047 A | 7/2015 |
| WO | WO 2014/145849 A1 | 9/2014 |

OTHER PUBLICATIONS

Taiwanese Office Action and Search Report issued in Taiwanese Application No. 105137583 dated Apr. 20, 2017.
Stephan Kirchmeyer et al., "Scientific importance, properties and growing applications of poly(3,4-ethylenedioxythiophene)", Journal of Materials Chemistry, 2005, vol. 15, pp. 2077-2088.
Svetlana Demtchenko et al., "Characterization and assessment of a novel hybrid organic/inorganic metal-insulator-semiconductor structure for photovoltaic applications", Proceedings of SPIE, 2010, vol. 7750, 9 pages.
Udo Lang et al., "Microscopical Investigations of PEDOT:PSS Thin Films", Advanced Functional Materials, 2009, vol. 19, pp. 1215-1220.
Ushula M. Tefashe et al., "Localized Corrosion Behavior of AZ31B Magnesium Alloy with an Electrodeposited Poly(3,4-Ethylenedioxythiophene) Coating", Journal of the Electrochemical Society, 2015, vol. 162, pp. C536-C544.
Chinese Office Action and Search Report for corresponding Chinese Application No. 201611126816.4, dated Apr. 19, 2018.

* cited by examiner

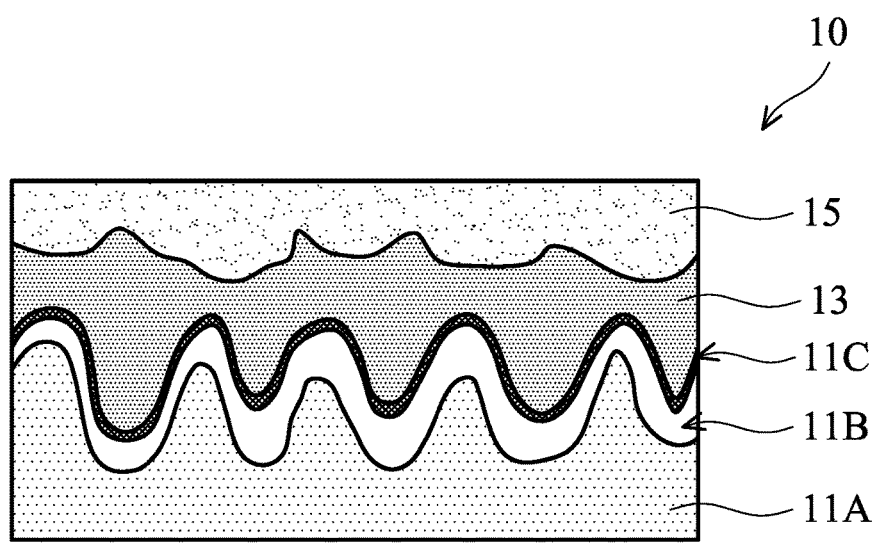

CAPACITOR STRUCTURE

CROSS REFERENCE TO RELATED APPLICATIONS

This application claims priority of Taiwan Patent Application No. 104143993, filed on Dec. 28, 2015, and Taiwan Patent Application No. 105137583, filed on Nov. 17, 2016, the entirety of which is incorporated by reference herein.

TECHNICAL FIELD

The technical field relates to a capacitor structure.

BACKGROUND

The major topic of developing an electrolytic capacitor is increasing the conductivity of the electrolyte to reduce the equivalent series resistance (ESR) and improve the reliability of a capacitor. A conductive polymer has a higher conductivity than that of a liquid state electrolyte or a solid state organic semiconductor complex salt (e.g. TCNQ composite salt) in a conventional electrolytic capacitor, and a suitable insulation property at high temperature, such that the conductive polymer is the most common solid state electrolyte utilized in a modern electrolytic capacitor.

Compared to a conventional liquid state electrolyte, a conductive conjugated polymer (formed by in-situ polymerization) used as an electrolyte in a capacitor may give the capacitor lower impedance and higher thermal stability. However, the withstanding voltage of the conductive conjugated polymer is dramatically lower than that of the liquid state electrolyte. As such, the low working voltage of the conductive conjugated polymer is the major obstacle in the applications for the electrolytic capacitor.

Accordingly, a novel capacitor structure is called for to overcome the limitations described above.

SUMMARY

One embodiment of the disclosure provides a capacitor structure, comprising: a positive electrode; a dielectric layer on the positive electrode; an organic-inorganic composite layer on the dielectric layer; a negative electrode; and a conductive conjugated polymer electrolyte disposed between the organic-inorganic composite layer and the negative electrode.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows a capacitor structure in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In one embodiment, a capacitor structure 10 includes a positive electrode 11A, a dielectric layer 11B on the positive electrode 11A, an organic-inorganic composite layer 11C on the dielectric layer 11B, a negative electrode 15, and an electrolyte disposed between the organic-inorganic composite layer 11C and the negative electrode 15, as shown in FIG. 1. In one embodiment, the positive electrode 11A includes a valve metal such as aluminum, tantalum, niobium, titanium, zirconium, or an alloy thereof. The positive electrode 11A may have the shape of sheet-shaped foil or a porous pastille (from sintering particles). The positive electrode 11A can optionally be etched to have a higher specific surface area.

In one embodiment, the dielectric layer 11B can be an oxide of the positive electrode 11A. For example, the surface of the positive electrode 11A can be chemically treated, thereby forming the dielectric layer 11B on the surface of the positive electrode 11A. Alternatively, the dielectric layer 11B can be formed by other methods, e.g. sputtering a metal oxide on the positive electrode 11A.

The organic-inorganic composite layer 11C can be single-layered or multi-layered. In one embodiment, the organic-inorganic composite layer 11C is formed by mixing an insulation polymer and an inorganic substance. For example, a monomer or precursor of the insulation polymer can be mixed with the inorganic substance, and the monomer or the precursor can be then polymerized to form the insulation polymer. Otherwise, the monomer or the precursor can be polymerized to form the insulation polymer, which is then mixed with the inorganic substance.

In one embodiment, the insulation polymer of the organic-inorganic composite layer 11C can be a nitrogen-containing polymer such as poly(vinyl pyrrolidone) (PVP), an oxygen-containing polymer such as poly(ethylene oxide) (PEO), or a blend thereof.

The molecular weight of the insulation polymer in the organic-inorganic composite layer 11C is not limited to a specific range. However, a linear insulation polymer may have a number average molecular weight (Mn) of 1000 to 2000000. A linear insulation polymer with an overly low Mn will be liquid at room temperature, which cannot easily form a stable layered structure on the surface of the dielectric layer. A linear insulation polymer with an overly high Mn also negatively influences the organic-inorganic composite layer to form a film of the surface of the dielectric layer.

A precursor of the inorganic substance can be mixed with the insulation polymer or the precursor thereof, and then reacted to form the inorganic substance. Otherwise, the precursor of the inorganic substance can be reacted to form the inorganic substance, and then mixed with the insulation polymer or the precursor thereof.

In one embodiment, the inorganic substance can be aluminum oxide, zinc oxide, a combination of boric acid and zinc oxide, or a combination of boric acid and aluminum hydroxide. In one embodiment, the inorganic substance has the shape of particle with an average diameter less than or equal to 1000 μm for being evenly dispersed in the organic-inorganic composite layer 11C. In one embodiment, the inorganic substance has an average diameter of 10 nm to 100 nm. In the organic-inorganic composite layer 11C, the insulation polymer and the inorganic substance have a weight ratio of 1:100 to 100:1 (e.g. 100:40). In other words, the organic-inorganic composite layer 11C may include 1 part by weight of the insulation polymer and 100 to 0.01 parts by weight of the inorganic substance.

The negative electrode 15 can be a metal foil, and the surface of the metal foil can optionally be etched to obtain a higher specific surface area. Other material such as carbon or titanium can be adhered on the metal foil to enhance a chemical stability or capacitance of the capacitor structure. In one embodiment, the negative electrode 15 can be a conductive silver glue or carbon glue adhering on the electrolyte 13.

The electrolyte 13 can be conductive conjugated polymer, such as doped polythiophene, polypyrrole, polyaniline, or a derivative thereof. In one embodiment, the conductive conjugated polymer can be poly(3,4-ethylene dioxythiophene) (PEDOT), or a copolymer or a blend including the above polymer.

For excellent conductivity, the conjugated polymer can be doped. The dopant can be sulfonic acid type (such as methane sulfonic acid, benzene sulfonic acid, or p-toluene sulfonic acid), sulfonic acid polymer type (such as poly (styrene sulfonic acid) (PSS) or a copolymer thereof), carboxylic acid type (such as benzoic acid, benzene dicarboxylic acid, or succinic acid), carboxylic acid polymer type (such as polyacrylic acid or a copolymer thereof), amino acid type (such as glycine), phosphoric acid type (such as phosphoric acid, etidronic acid, or diphenyl phosphate), or a combination thereof.

The conjugated polymer can be doped using the following methods: the conjugated polymer is polymerized and then doped by adding the dopant, the dopant is added during the polymerization of the conjugated polymer, or a sided product of initiating the polymerization of the conjugated polymer by an oxidant serving as the dopant. For example, iron(III) p-toluenesulfonate may initiate the polymerization of the conjugated polymer, and the side product of the initiator (p-toluene sulfonic acid) during the polymerization may serve as the dopant.

Conductive conjugated polymer can be synthesized by in-situ chemical polymerization (e.g. a precursor of the conductive conjugated polymer is polymerized at the surface of the organic-inorganic composite layer 11C) or electrochemical polymerization (e.g. a monomer of the conductive conjugated polymer is electrochemically polymerized at the surface of the organic-inorganic composite layer 11C). Alternatively, an aqueous solution of a synthesized water-soluble conductive polymer is directly coated on or impregnated in the surface of the organic-inorganic composite layer 11C to serve as the conductive conjugated polymer. An oxidant used in the in-situ chemical polymerization can be an iron-containing salt such as iron(III) benzene sulfonic acid, iron(III) p-toluene sulfonic acid, iron chloride, iron nitrate, iron sulfate, or a combination thereof or a copper-containing salt such as copper persulfate.

In one embodiment, an aluminum foil can be electrochemically etched to have a high surface area, and a carbon layer is then adhered onto the etched aluminum foil to obtain a negative electrode 15. A separator paper (not shown) can be then optionally disposed between the positive electrode 11A and the negative electrode 15, which are wound to form a solid state electrolytic capacitor element. In some embodiments, the solid state electrolytic capacitor element can be treated by organic acid aqueous solution to repair the broken dielectric layer 11B. In one embodiment, the organic acid can be oxalic acid or acetic acid.

The solid state electrolytic capacitor element is then impregnated in an aqueous liquid of the organic-inorganic composite, and then heated to remove water to form the organic-inorganic composite layer 11C on the dielectric layer 11B. In one embodiment, the insulation layer of the organic-inorganic composite layer 11C can be the nitrogen-containing polymer (e.g. PVP) or the oxygen-containing polymer (e.g. PEO) with Mn of 1000 to 2000000. In one embodiment, the inorganic substance in the organic-inorganic composite layer 11C can be aluminum oxide or zinc oxide. In one embodiment, the inorganic substance is aluminum oxide. In one embodiment, the inorganic substance is zinc oxide. In one embodiment, the inorganic substance is a combination of boric acid and zinc oxide. In one embodiment, the inorganic substance is a combination of boric acid and aluminum hydroxide.

The solid state electrolytic capacitor element is then impregnated in the precursor of the conductive conjugated polymer, and the precursor is then polymerized to form the conductive conjugated polymer serving as the electrolyte 13 between the positive electrode 11A and the negative electrode 15. In one embodiment, the conductive conjugated polymer can be doped polythiophene, polypyrrole, polyaniline, or poly(3,4-ethylene dioxythiophene).

For the solid state capacitor structure, the defect or non-uniform thickness of the dielectric layer will degrade the voltage resistance of the local area of the dielectric layer. In ideal conditions, a local insulation reaction of the conductive conjugated polymer electrolyte may enhance the voltage resistance of the local area of the dielectric layer. However, the conductive conjugated polymer electrolyte may produce a large amount of insulation due to an overly high voltage or a serious defect of the dielectric layer, such that the capacitor may have a dramatic capacitance decay, increased impedance, and an overly high leakage current. In the worst conditions, the capacitor cannot resist the working voltage, which results in a short circuit. The organic-inorganic composite layer can fill the local area of the dielectric layer (e.g. the area with a thinner thickness) and the structural defect for enhancing the voltage resistance of the capacitor and reducing the chance of insulation occurred in the conductive conjugated polymer electrolyte. As such, the impedance and the capacitance of the capacitor structure can be stabilized for the long term.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

An aluminum foil positive electrode was treated by electrochemical electrolysis of 21V to form an aluminum oxide dielectric layer on the aluminum foil positive electrode. A carbon foil negative electrode was electrochemically corroded to have a high surface area. A separator paper was disposed between the positive electrode and the negative electrode, which were wound to form a solid state electrolytic capacitor element. The solid state electrolytic capacitor element was treated by an organic acid aqueous solution to repair the broken aluminum oxide dielectric layer.

The solid state electrolytic capacitor element was then impregnated in a mixture composed of EDOT monomer and an ethanol solution of iron(III) toluene sulfonic acid (50 wt %), and then heated to accelerate the polymerization of the EDOT. The polymerization could be heated to 170° C. to ensure the complete reaction. A conductive conjugated polymer (e.g. doped PEDOT) was formed between the positive electrode and the negative electrode after the polymerization. The solid state electrolytic capacitor element was then put into an aluminum shell and then sealed by a rubber cap, thereby completing a solid state capacitor. The properties of the solid state capacitor after sealing are shown in Table 2. A current of 16V was applied to the capacitor at 125° C. for 12 hours to perform an overvoltage load test, and the properties of the solid state capacitor after the overvoltage load test are shown in Table 2.

Comparative Example 2

Comparative Example 2 was similar to Comparative Example 1, with the difference being that the solid state electrolytic capacitor element was impregnated in an aqueous solution of PVP with Mn of about 1300000 (See Table 1) before being impregnated in a mixture composed of EDOT monomer and an ethanol solution of iron(III) toluene sulfonic acid (50 wt %). The solid state electrolytic capacitor element was then heated to 60° C. and kept at 60° C. for 1 hour, and then heated to 125° C. and kept at 125° C. for 1 hour to remove water, thereby forming a PVP layer on the aluminum oxide dielectric layer. The following steps such as forming the doped PEDOT, sealing, property measurement after sealing, and property measurement after the overvoltage load test were similar to that in Comparative Example 1. The properties of the capacitor are shown in Table 2.

Example 1

Example 1 was similar to Comparative Example 1, with the difference being that the solid state electrolytic capacitor element was impregnated in an aqueous solution of PVP with Mn of about 1300000 and γ-$Al_2O_3$ with a diameter of 40 nm to 80 nm (See Table 1) before being impregnated in a mixture composed of EDOT monomer and an ethanol solution of iron(III) toluene sulfonic acid (50 wt %). The solid state electrolytic capacitor element was then heated to 60° C. and kept at 60° C. for 1 hour, and then heated to 125° C. and kept at 125° C. for 1 hour to remove water, thereby forming an organic-inorganic composite layer (PVP-γ-$Al_2O_3$) on the aluminum oxide dielectric layer. The following steps such as forming the doped PEDOT, sealing, property measurement after sealing, and property measurement after the overvoltage load test were similar to that in Comparative Example 1. The properties of the capacitor are shown in Table 2.

Example 2

Example 2 was similar to Example 1, with the difference being that the aqueous solution of PVP and γ-$Al_2O_3$ was replaced with an aqueous solution of PVP and ZnO with a diameter of about 20 nm (See Table 1), thereby forming an organic-inorganic composite layer (PVP—ZnO) on the aluminum oxide dielectric layer. The properties of the capacitor are shown in Table 2.

Comparative Example 3

Comparative Example 3 was similar to Example 1, with the difference being that the aqueous solution of PVP and γ-$Al_2O_3$ was replaced with an aqueous solution of PVP and $TiO_2$ with a diameter of less than 25 nm (See Table 1), thereby forming an organic-inorganic composite layer (PVP—$TiO_2$) on the aluminum oxide dielectric layer. The properties of the capacitor are shown in Table 2.

TABLE 1

The composition of the aqueous liquid for forming the organic-inorganic composite layer (wt %)

| | γ-$Al_2O_3$ | ZnO | $TiO_2$ | PVP | Water |
|---|---|---|---|---|---|
| Comparative Example 1 | 0 | 0 | 0 | 0 | 0 |
| Comparative Example 2 | 0 | 0 | 0 | 2.5 | 97.5 |
| Example 1 | 1 | 0 | 0 | 2.5 | 96.5 |
| Example 2 | 0 | 1 | 0 | 2.5 | 96.5 |
| Comparative Example 3 | 0 | 0 | 1 | 2.5 | 96.5 |

TABLE 2

| | | Properties of the capacitor after sealing | | Properties of the capacitor after the overvoltage load test* | | | | |
|---|---|---|---|---|---|---|---|---|
| | | Capacitance (μF) | 100 kHz ESR (mΩ) | Capacitance (μF) | ΔCp (%) | 100 kHz ESR (mΩ) | 16 V leakage current (μA) | Short circuit ratio (%) |
| Comparative Example 1 | Average | 387.48 | 20.52 | 319.65 | −17.51 | 38.55 | 1743.50 | 60 |
| | Standard Deviation | 1.47 | 1.00 | 13.22 | | 9.55 | 2102.23 | |
| Comparative Example 2 | Average | 386.64 | 14.34 | 353.04 | −8.69 | 18.18 | 298.40 | 0 |
| | Standard Deviation | 1.69 | 0.72 | 8.22 | | 1.60 | 60.53 | |
| Example 1 | Average | 382.48 | 13.08 | 371.92 | −2.76 | 15.14 | 235.00 | 0 |
| | Standard Deviation | 4.74 | 0.82 | 16.56 | | 0.83 | 88.28 | |
| Example 2 | Average | 389.18 | 13.76 | 378.56 | −2.73 | 15.14 | 59.20 | 0 |
| | Standard Deviation | 2.78 | 0.50 | 8.96 | | 0.82 | 17.85 | |
| Comparative Example 3 | Average | 383.22 | 12.96 | 330.48 | −13.76 | 14.38 | 4080.00 | 20 |
| | Standard Deviation | 1.87 | 0.39 | 27.00 | | 9.51 | 2469.18 | |

*The properties of the capacitor after the overvoltage load test do not include the capacitors having short circuit after the test.

As shown in Table 2, the capacitance of the capacitors in Comparative Examples 1-3 and Examples 1-2 were similar. The capacitors in Examples 1-2 and Comparative Examples 2-3 had the equivalent series resistance (ESR) at 100 kHz, obviously lower than that of the capacitor in Comparative Example 1.

The aluminum oxide dielectric layer in Examples 1 and 2 and Comparative Examples 1-3, being treated by electrochemical electrolysis of 21V and before forming the organic-inorganic composite layer thereon, had the proper maximum working voltage of 10V. The properties of the capacitors were dramatically different after the overvoltage load test (e.g. tested by the overvoltage of 16V at 125° C. for 12 hours). In Comparative Example 1, the capacitor with the dielectric layer in direct contact with the conductive conjugated polymer electrolyte, the capacitance was decayed 17.51%, the ESR at 100 kHz was dramatically increased after the overvoltage load test, the 16V average leakage current was up to 1743 μA, and the short circuit ratio was up to 60%. In Comparative Example 2, the capacitor with a PVP layer on the dielectric layer, the capacitance was decayed 8.69% after the overvoltage load test. The ESR at 100 kHz of the capacitor was increased from 14.43 mΩ (after sealing) to 18.18 mΩ (after the overvoltage load test), which was increased about 26%. In Examples 1 and 2 and Comparative Example 3, the capacitors included the organic-inorganic composite layers on the dielectric layer. In Examples 1 (PVP-aluminum oxide) and Example 2 (PVP-zinc oxide), the capacitance was slightly decayed about 2.7%, the ESR at 100 kHz was slightly increased 15%, and no short circuit or an overly high leakage current occurred. Although the capacitor in Comparative Example 3 included the organic-inorganic composite layer on the dielectric layer (PVP-titanium oxide), the capacitance was decayed 13.76%, the leakage current was up to 4080 μA, and 20% of the capacitor had short circuit after the overvoltage test.

Accordingly, only the specific organic-inorganic composite layer (such as PVP-aluminum oxide and PVP-zinc oxide) on the dielectric layer could efficiently improve the voltage resistance and the stability of the capacitor. The organic-inorganic composite layer could make the capacitor have a higher capacitance, lower resistance, and lower leakage current without the short circuit after the overvoltage load test.

Comparative Examples 4 to 8 and Examples 3 and 4

An aluminum foil positive electrode was treated by electrochemical electrolysis of 67V to form an aluminum oxide dielectric layer on the aluminum foil positive electrode. A carbon foil negative electrode was electrochemically corroded to have a high surface area. A separator paper was disposed between the positive electrode and the negative electrode, which were wound to form a solid state electrolytic capacitor element. The solid state electrolytic capacitor element was treated by an organic acid aqueous solution to repair the broken aluminum oxide dielectric layer.

The solid state electrolytic capacitor element was impregnated in an aqueous solution of different compositions (See Table 3), wherein PVP had Mn of about 1300000. The solid state electrolytic capacitor element was then heated to 60° C. and kept at 60° C. for 1 hour, and then heated to 125° C. and kept at 125° C. for 1 hour to remove water, thereby forming an organic-inorganic composite layer on the aluminum oxide dielectric layer.

The solid state electrolytic capacitor element was then impregnated in a mixture composed of EDOT monomer and an ethanol solution of iron(III) toluene sulfonic acid (50 wt %), and then heated to accelerate the polymerization of the EDOT. The polymerization could be heated to 170° C. to ensure the complete reaction. A conductive conjugated polymer (e.g. doped PEDOT) was formed between the positive electrode and the negative electrode after the polymerization. The solid state electrolytic capacitor element was then put into an aluminum shell and then sealed by a rubber cap, thereby completing a solid state capacitor. The properties of the solid state capacitor after sealing are shown in Table 2. A current of 40.5V was applied to the capacitors at 125° C. for 12 hours to perform an overvoltage load test, and the properties of the solid state capacitors after the overvoltage load test are shown in Tables 4 and 5.

TABLE 3

| | The composition of the aqueous liquid for forming the organic-inorganic composite layer (wt %) | | | | | |
|---|---|---|---|---|---|---|
| | Al(OH)$_3$ | H$_3$BO$_4$ | Imidazole | ZnO | PVP | Water |
| Comparative Example 4 | 0 | 0 | 0 | 0 | 2.5 | 97.5 |
| Comparative Example 5 | 1 | 0 | 0 | 0 | 2.5 | 96.5 |
| Comparative Example 6 | 0 | 1 | 0 | 0 | 2.5 | 96.5 |
| Comparative Example 7 | 0 | 0 | 1 | 0 | 2.5 | 96.5 |
| Comparative Example 8 | 0 | 1 | 1 | 0 | 2.5 | 95.5 |
| Example 3 | 1 | 1 | 0 | 0 | 2.5 | 95.5 |
| Example 4 | 0 | 1 | 0 | 1 | 2.5 | 95.5 |

TABLE 4

| | | Properties of the capacitor after sealing | | Properties of the capacitor after the overvoltage load test* | | | | |
|---|---|---|---|---|---|---|---|---|
| | | Capacitance (μF) | 100 kHz ESR (mΩ) | Capacitance (μF) | ΔCp (%) | 100 kHz ESR (mΩ) | 40.5 V leakage current (μA) | Short circuit ratio (%) |
| Comparative Example 4 (PVP) | Average | 124.20 | 16.46 | 120.13 | −3.28 | 18.63 | 3.18 | 20 |
| | Standard Deviation | 0.81 | 0.82 | 0.93 | | 0.73 | 0.43 | |
| Comparative Example 5 (PVP + Al(OH)$_3$) | Average | 121.12 | 17.38 | 120.60 | −0.43 | 17.87 | 3.60 | 40 |
| | Standard Deviation | 4.59 | 2.09 | 0.95 | | 0.85 | 2.43 | |

TABLE 4-continued

|  |  | Properties of the capacitor after sealing | | Properties of the capacitor after the overvoltage load test* | | | | |
| --- | --- | --- | --- | --- | --- | --- | --- | --- |
|  |  | Capacitance (μF) | 100 kHz ESR (mΩ) | Capacitance (μF) | ΔCp (%) | 100 kHz ESR (mΩ) | 40.5 V leakage current (μA) | Short circuit ratio (%) |
| Comparative Example 6 (PVP + H$_3$BO$_4$) | Average Standard Deviation | 122.90 1.81 | 16.26 0.80 | 121.30 0.66 | −1.30 | 17.00 1.37 | 2.60 1.14 | 40 |
| Example 3 (PVP + Al(OH)$_3$ + H$_3$BO$_4$) | Average Standard Deviation | 122.78 0.89 | 17.62 1.08 | 120.82 2.22 | −1.60 | 17.72 1.05 | 5.08 3.40 | 0 |
| Example 4 (PVP + ZnO + H$_3$BO$_4$) | Average Standard Deviation | 122.50 3.18 | 15.92 0.61 | 122.32 3.22 | −0.15 | 15.94 0.48 | 2.40 0.94 | 0 |

*The properties of the capacitor after the overvoltage load test do not include the capacitors having short circuit after the test.

The aluminum oxide dielectric layer in Examples 3 and 4 and Comparative Examples 4-8, being treated by electrochemical electrolysis of 67V and before forming the organic-inorganic composite layer thereon, had the proper maximum working voltage of 30V. The properties of the capacitors after sealing in Examples 3 and 4 and Comparative Examples 4-8 were similar. After the 40.5V overvoltage load test, the capacitors in Comparative Examples 4 to 6 had different short circuit ratios. The capacitor with the combination of aluminum hydroxide and PVP serving as the capacitor protective layer (Comparative Example 5) and the capacitor with the combination of boric acid and PVP serving as the capacitor protective layer (Comparative Example 6) had higher short circuit ratios than that of the capacitor with pure PVP serving as the capacitor protective layer (Comparative Example 4). Otherwise, the combination of aluminum hydroxide, boric acid, and PVP serving as the capacitor protective layer (Example 3) could mitigate the short circuit phenomenon of the capacitor after the overvoltage load test. On the other hand, the combination of zinc oxide, boric acid, and PVP serving as the capacitor protective layer (Example 4) could also mitigate the short circuit phenomenon of the capacitor after the overvoltage load test.

As shown in Table 5, the capacitor with the combination of imidazole and PVP serving as the capacitor protective layer (Comparative Example 7) had similar properties and short circuit ratio as those of the capacitor with pure PVP serving as the capacitor protective layer (Comparative Example 4). However, the capacitor with the combination of imidazole, boric acid, and PVP serving as the capacitor protective layer (Comparative Example 8) had short circuit ratio of 100% after the overvoltage load test. Accordingly, the combination of boric acid and specific inorganic alkaline (e.g. zinc oxide or aluminum hydroxide) serving as the capacitor protective layer could enhance the voltage resistance of the capacitor. On the contrary, boric acid alone or the combination of boric acid and organic alkaline (e.g. imidazole) serving as the capacitor protective layer reduce the voltage resistance of the capacitor.

It will be apparent to those skilled in the art that various modifications and variations can be made to the disclosed methods and materials. It is intended that the specification and examples be considered as exemplary only, with the true scope of the disclosure being indicated by the following claims and their equivalents.

TABLE 5

|  |  | Properties of the capacitor after sealing | | Properties of the capacitor after the overvoltage load test* | | | | |
| --- | --- | --- | --- | --- | --- | --- | --- | --- |
|  |  | Capacitance (μF) | 100 kHz ESR (mΩ) | Capacitance (μF) | ΔCp (%) | 100 kHz ESR (mΩ) | 40.5 V leakage current (μA) | Short circuit ratio (%) |
| Comparative Example 4 (PVP) | Average Standard Deviation | 124.20 0.81 | 16.46 0.82 | 120.13 0.93 | −3.28 | 18.63 0.73 | 3.18 0.43 | 20 |
| Comparative Example 6 (PVP + H$_3$BO$_4$) | Average Standard Deviation | 122.90 1.81 | 16.26 0.80 | 121.30 0.66 | −1.30 | 17.00 1.37 | 2.60 1.14 | 40 |
| Comparative Example 7 (PVP + imidazole) | Average Standard Deviation | 122.24 1.24 | 18.70 1.10 | 120.93 0.66 | −1.07 | 19.65 1.60 | 2.70 0.55 | 20 |
| Comparative Example 8 (PVP + H$_3$BO$_4$ + imidazole) | Average Standard Deviation | 122.78 0.89 | 18.50 1.56 | — | — | — | — | 100 |

*The properties of the capacitor after the overvoltage load test do not include the capacitors having short circuit after the test.

What is claimed is:

1. A capacitor structure, comprising:
   a positive electrode;
   a dielectric layer on the positive electrode;
   an organic-inorganic composite layer on the dielectric layer;
   a negative electrode; and
   a conductive conjugated polymer electrolyte disposed between the organic-inorganic composite layer and the negative electrode.

2. The capacitor structure as claimed in claim 1, wherein the positive electrode comprises aluminum, tantalum, niobium, titanium, zirconium, or an alloy thereof.

3. The capacitor structure as claimed in claim 1, wherein the dielectric layer comprises an oxide of the positive electrode.

4. The capacitor structure as claimed in claim 1, wherein the organic-inorganic composite layer comprises 1 part by weight of an insulation polymer and 100 to 0.01 parts by weight of an inorganic substance.

5. The capacitor structure as claimed in claim 4, wherein the insulation polymer comprises a nitrogen-containing polymer, an oxygen-containing polymer, or a blend thereof.

6. The capacitor structure as claimed in claim 5, wherein the nitrogen-containing polymer comprises polyvinylpyrrolidone.

7. The capacitor structure as claimed in claim 5, wherein the oxygen-containing polymer comprises poly(ethylene oxide).

8. The capacitor structure as claimed in claim 4, wherein the inorganic substance comprises aluminum oxide, zinc oxide, a combination of boric acid and zinc oxide, or a combination of boric acid and aluminum hydroxide.

9. The capacitor structure as claimed in claim 1, wherein the negative electrode comprises a metal foil.

10. The capacitor structure as claimed in claim 1, wherein conductive conjugated polymer electrolyte comprises doped polythiophene, polypyrrole, polyaniline, or poly(3,4-ethylene dioxythiophene).

* * * * *